US012710963B2

(12) United States Patent
Gopalan et al.

(10) Patent No.: US 12,710,963 B2
(45) Date of Patent: Aug. 18, 2026

(54) CHIP SET CENTRAL PROCESSING UNIT CROSS REFERENCE CODE ALIGNED BASIC INPUT/OUTPUT SYSTEM FOR SEAMLESS BOOT

(71) Applicant: Dell Products L.P., Round Rock, TX (US)

(72) Inventors: Karthik Gopalan, Chennimalai (IN); Gowrishankar Rudraprakash, Bengaluru (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/783,856

(22) Filed: Jul. 25, 2024

(65) Prior Publication Data

US 2026/0030031 A1 Jan. 29, 2026

(51) Int. Cl.
*G06F 9/4401* (2018.01)

(52) U.S. Cl.
CPC .................................. *G06F 9/4403* (2013.01)

(58) Field of Classification Search
CPC ....... G06F 9/4403; G06F 9/4406; G06F 9/445
See application file for complete search history.

(56) References Cited

U.S. PATENT DOCUMENTS 6,081,890 A * 6/2000 Datta .................... G06F 9/4401 713/1
7,673,131 B2 * 3/2010 Azzarello ............ G06F 9/4406 713/2
2006/0129795 A1 * 6/2006 Bulusu ................. G06F 9/4401 713/2
2008/0172554 A1 * 7/2008 Armstrong .......... G06F 9/45558 713/2
2013/0305013 A1 * 11/2013 Ebersole ............. G06F 9/30189 712/32
2016/0188345 A1 * 6/2016 Chen ..................... G06F 9/4403 713/2

* cited by examiner

*Primary Examiner* — Hyun Soo Kim
(74) *Attorney, Agent, or Firm* — Terrile, Cannatti & Chambers, LLP; Stephen A. Terrile

(57) ABSTRACT

A firmware management operation. The firmware management operation includes identifying a processor environment installed on an information handling system from a plurality of processor environments, the processor environment comprising processor architecture, the processor architecture comprising a processor architecture version; providing the information handling system with a distributed BIOS, the distributed BIOS comprising a particular firmware configuration, the firmware particular configuration comprising a particular set of firmware components, the particular set of firmware components being based upon the processor architecture version; and, booting the information handling system using the particular firmware configuration based upon the processor architecture version.

20 Claims, 11 Drawing Sheets

| Chipset 602 | Processor Family 604 |
| --- | --- |
| 'A' | 'A' |
| | 'A$_1$' (Derived) |
| 'B' | 'B' |
| | 'B$_1$' (Derived) |
| 'C' | 'C' |
| | 'C$_1$' (Derived) |
| 'D' | 'D' |
| | 'D$_1$' (Derived) |
| 'x' | 'x' |
| | 'x$_1$' (Derived) |

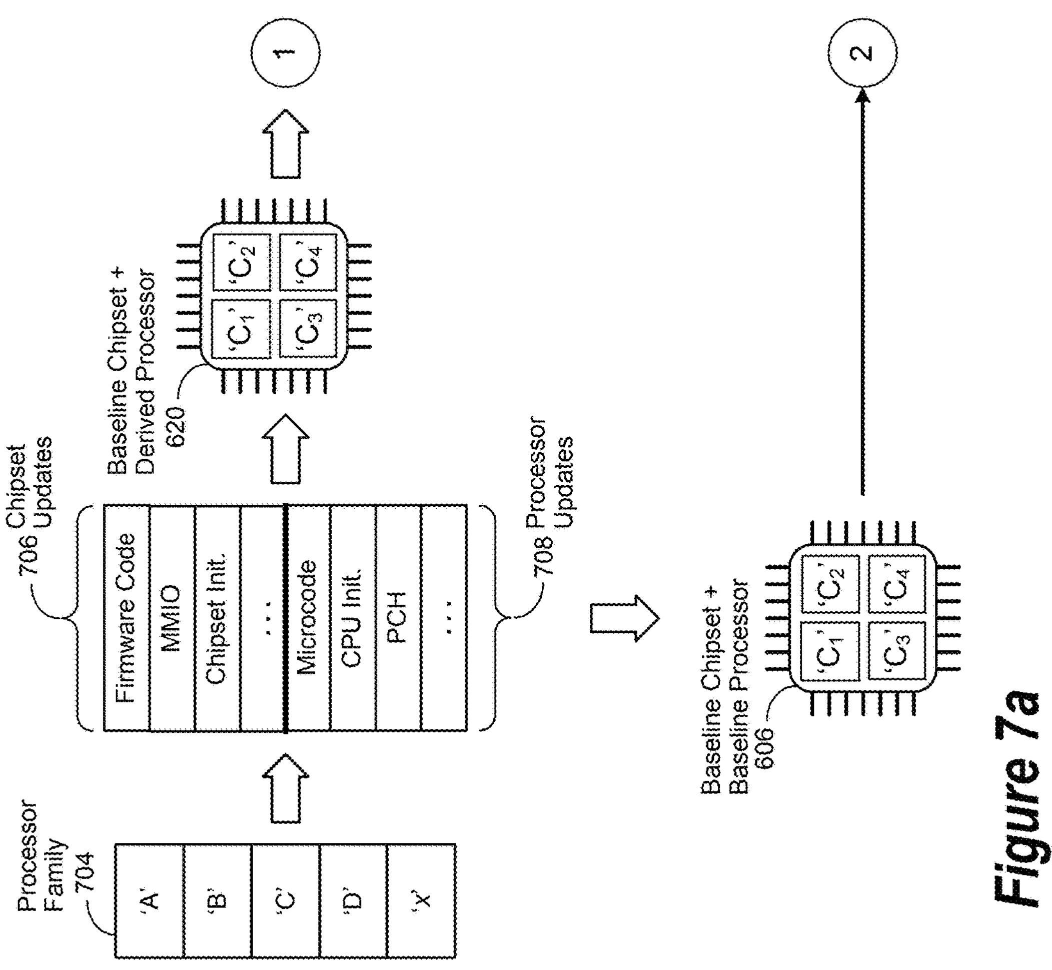

Figure 7a

| Chipset 602 | Processor Family 604 | Processor Challenges 702 |
| --- | --- | --- |
| 'A' | 'A' | None |
| | $'A_1'$ (Derived) | • Firmware Code • MMIO • Microcode • PCH • . . . |
| 'B' | 'B' | None |
| | $'B_1'$ (Derived) | • Firmware Code • MMIO • Microcode • PCH • . . . |
| 'C' | 'C' | None |
| | $'C_1'$ (Derived) | • Firmware Code • MMIO • Microcode • PCH • . . . |
| 'D' | 'D' | None |
| | $'D_1'$ (Derived) | • Firmware Code • MMIO • Microcode • PCH • . . . |
| 'x' | 'x' | None |
| | $'x_1'$ (Derived) | • Firmware Code • MMIO • Microcode • PCH • . . . |

Figure 7B:
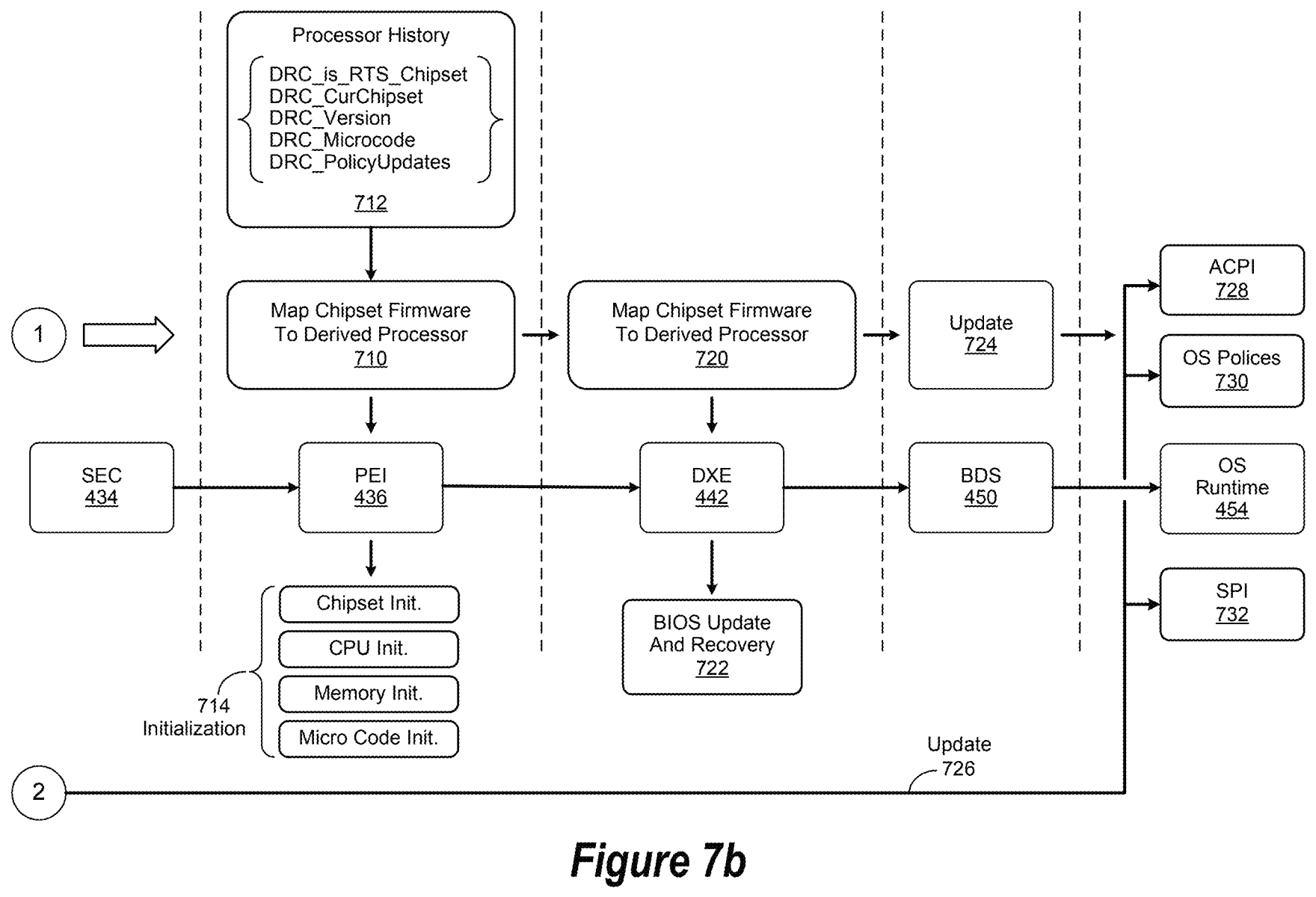

1

SEC 434

Processor History
DRC_is_RTS_Chipset
DRC_CurChipset
DRC_Version
DRC_Microcode
DRC_PolicyUpdates
712

Map Chipset Firmware To Derived Processor 710

PEI 436

Chipset Init.
CPU Init.
Memory Init.
Micro Code Init.

714 Initialization

Map Chipset Firmware To Derived Processor 720

DXE 442

BIOS Update And Recovery 722

Update 724

BDS 450

Update 726

ACPI 728

OS Polices 730

OS Runtime 454

SPI 732

CHIP SET CENTRAL PROCESSING UNIT CROSS REFERENCE CODE ALIGNED BASIC INPUT/OUTPUT SYSTEM FOR SEAMLESS BOOT

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: identifying a processor environment installed on an information handling system from a plurality of processor environments, the processor environment comprising processor architecture, the processor architecture comprising a processor architecture version; providing the information handling system with a distributed BIOS, the distributed BIOS comprising a particular firmware configuration, the firmware particular configuration comprising a particular set of firmware components, the particular set of firmware components being based upon the processor architecture version; and, booting the information handling system using the particular firmware configuration based upon the processor architecture version.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a processor environment installed on an information handling system from a plurality of processor environments, the processor environment comprising processor architecture, the processor architecture comprising a processor architecture version; providing the information handling system with a distributed BIOS, the distributed BIOS comprising a particular firmware configuration, the firmware particular configuration comprising a particular set of firmware components, the particular set of firmware components being based upon the processor architecture version; and, booting the information handling system using the particular firmware configuration based upon the processor architecture version.

In another embodiment the invention relates to a computer-readable storage medium embodying computer program code, the computer program code comprising computer executable instructions configured for: identifying a processor environment installed on an information handling system from a plurality of processor environments, the processor environment comprising processor architecture, the processor architecture comprising a processor architecture version; providing the information handling system with a distributed BIOS, the distributed BIOS comprising a particular firmware configuration, the firmware particular configuration comprising a particular set of firmware components, the particular set of firmware components being based upon the processor architecture version; and, booting the information handling system using the particular firmware configuration based upon the processor architecture version.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 7*a* and 7*b* are a simplified process flow diagram showing the performance of certain FCM operations to map individual components of a BKC of chipset firmware to a particular derivative processor architecture.

DETAILED DESCRIPTION

Figure 1:
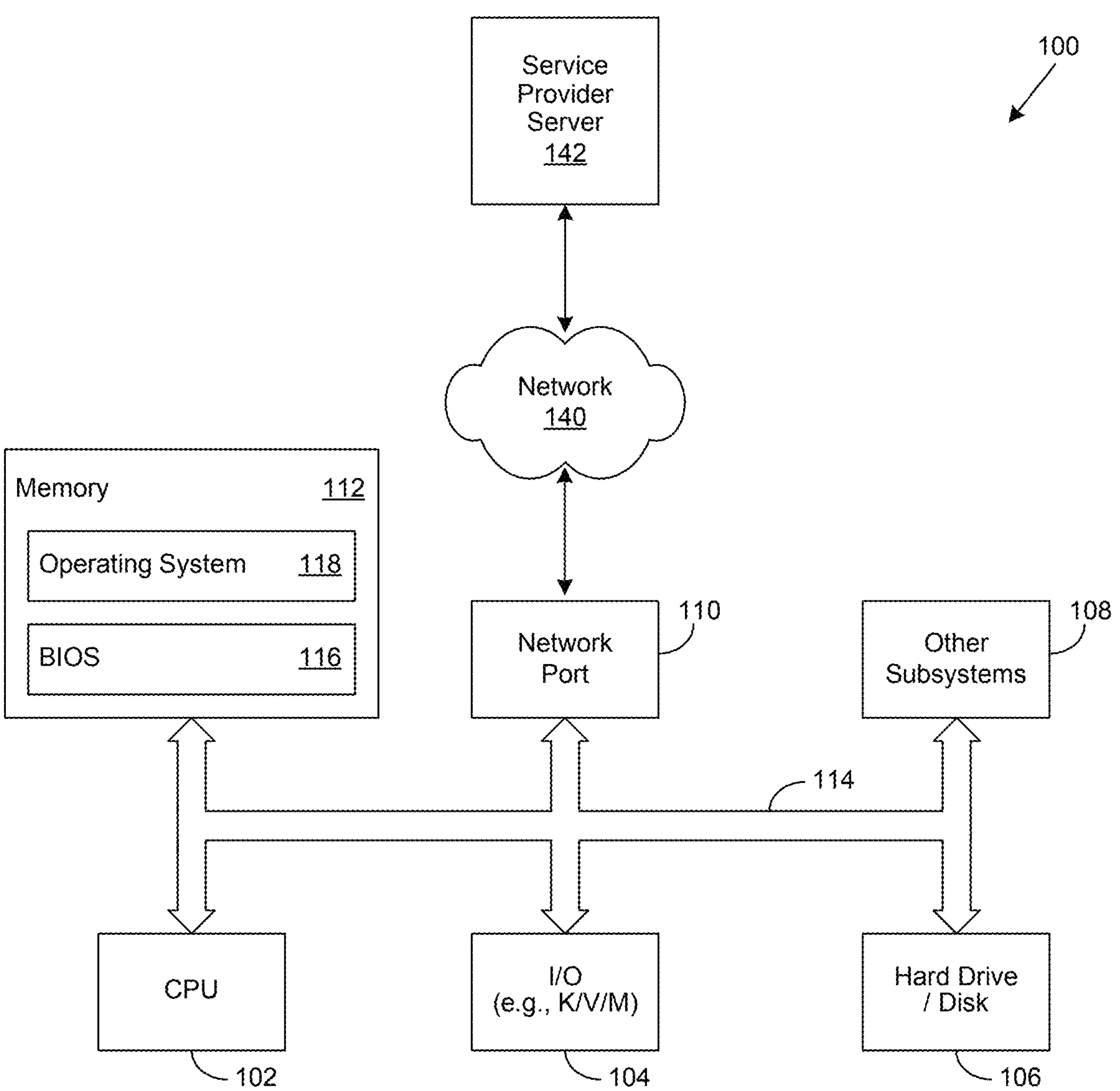
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that it is a common practice for manufacturers of processor integrated circuits (ICs), such as Intel®, AMD®, and Qualcomm®, to select a particular chipset to pair with processors that are in the same architecture family. For example, Intel® may select one chipset for use with its Alder Lake® (ADL) processor family and a different chipset for its Raptor Lake® (RPL) processor family. However, various aspects of the invention likewise reflect an appreciation that processor manufacturers may release new processors that include enhancements to support new requirements, or add additional functionalities, or both. Likewise, various aspects of the invention reflect an appreciation that while new processors are typically paired with a new chipset, they may be able to be implemented with an existing chipset. For example, Intel's ADL chipsets are designed to support ADL processors, but RPL processors can be derived from ADL processors. As such, RPL processors may be supported by an ADL chipset, resulting in a derived chipset-baseline processor combination.

Various aspects of the invention reflect an appreciation that when processor manufacturers introduce an interconnect processing unit (m) with vulnerability patches, seamless integration may be impeded if the vulnerabilities pertain to chipsets or the interface between chipsets and their associated processors. Using the previously described ADL-RPL derived chipset as an example, firmware updates and patches may be provided for RPL processors, but not for ADL processors, which may result in creating an issue when attempting to maintain compatibility with ADL processors. Various aspects of the invention reflect an appreciation that no known approach currently exists for maintaining compatibility between different processor architectures supported by the same chipset.

Likewise, various aspects of the invention reflect an appreciation that a system's processor and chipset may be upgraded to a new or later version, which in turn may result in changes that affect certain third-party devices such as Peripheral Component Interconnect (PCI) Direct Memory Access (DMA) controllers or Digital Signal Processor (DSP) controllers. For example, such devices may rely on attributes from the processor that no longer exist due to the update to the latest Best Known Configuration (BKC) of chipset firmware. Furthermore, various aspects of the invention reflect an appreciation that there is currently no known approach for managing dependencies between peripheral devices and derived chipset and derived processor combinations. Various aspects of the invention likewise reflect an appreciation that when microcode and Memory Reference Code (MRC) are released for a particular processor, and its corresponding chipset family, managing thermal and power configurations for the combination of the two typically results in the need for additional intelligence tailored to the particular chipset and processor combination.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100.

In various embodiments, the firmware management operation may be implemented to include the performance of a firmware compatibility management (FCM) operation. An FCM operation, as used herein, broadly refers to any function, task, procedure, or process performed, directly or indirectly, within a multi-processor operating environment, such as an architecture-specific distributed firmware management platform (ASDFMP), both of which are described in greater detail herein, to manage the compatibility of certain Basic Input/Output System (BIOS) firmware used to support a baseline processor architecture and one or more of its derivative processor architectures. As likewise used herein, a baseline processor architecture broadly refers to a particular processor architecture used as a referential starting point, or basis, to create a derivative thereof. In various embodiments, such a derivative processor architecture is based upon a baseline processor architecture, and may have additional, or fewer, components, features, functionalities, and capabilities, or a combination thereof, of its associated baseline processor architecture. In certain embodiments, the firmware management operation may be performed during operation of an IHS 100. In various embodiments, performance of the firmware management operation may result in the realization of improved operation of an IHS 100.

Figure 2:
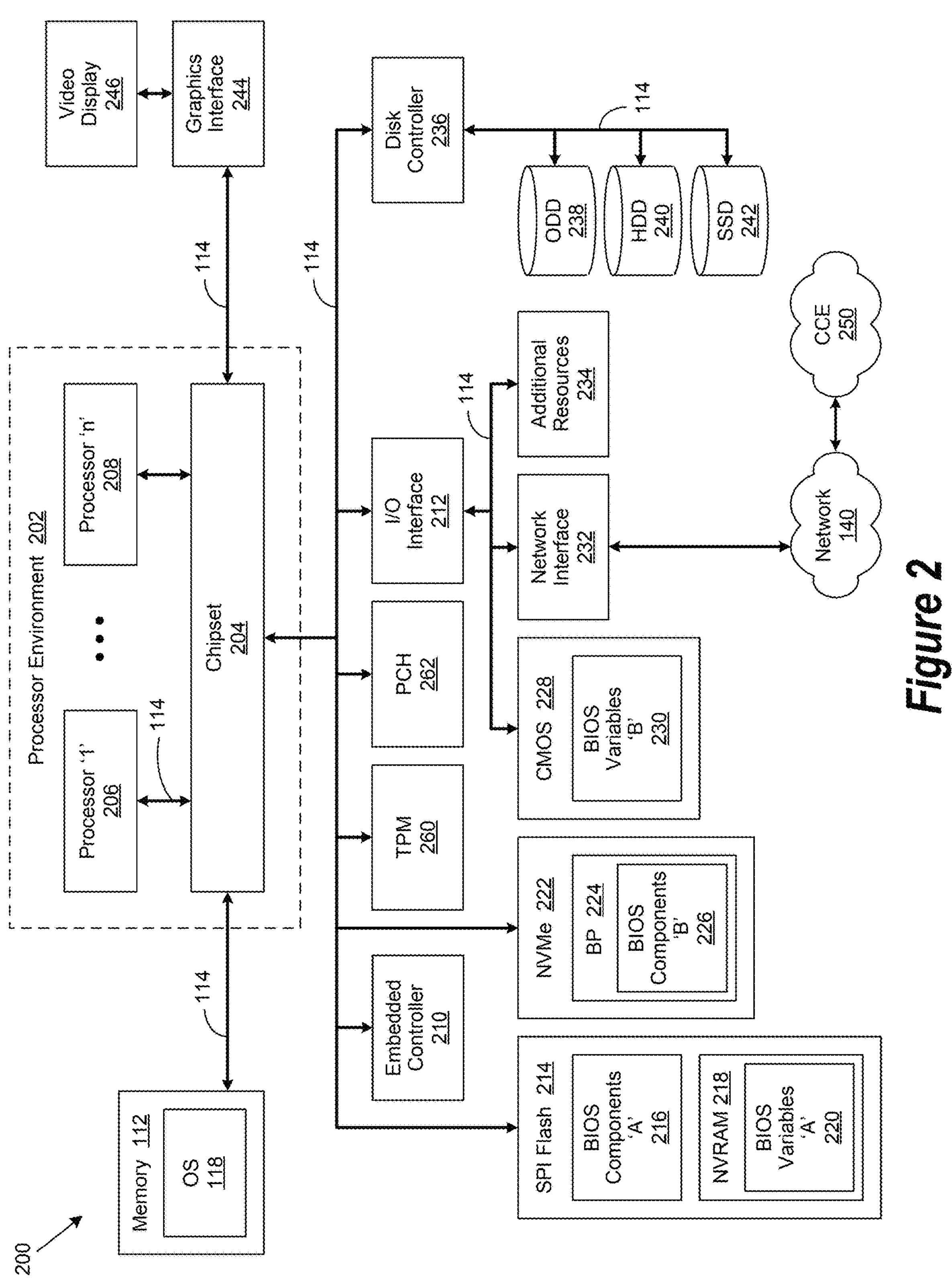
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as an information handling system (IHS), described in greater detail herein, such as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208. In various embodiments, the one or more architectures can include an x86 type processor architecture, an Advanced Reduced Instruction Set Computer (RISC) Machines (ARM) type processor architecture, or a combination thereof. In various embodiments, a processor environment implementing an x86 type processor architecture provides an x86 type processor environment. In various embodiments, a processor environment implementing an ARM type processor architecture provides an ARM type processor environment.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, a Trusted Platform Module (TPM) 260, a Platform Controller Hub (PCH) 262, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the TPM 260, the PCH 262, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
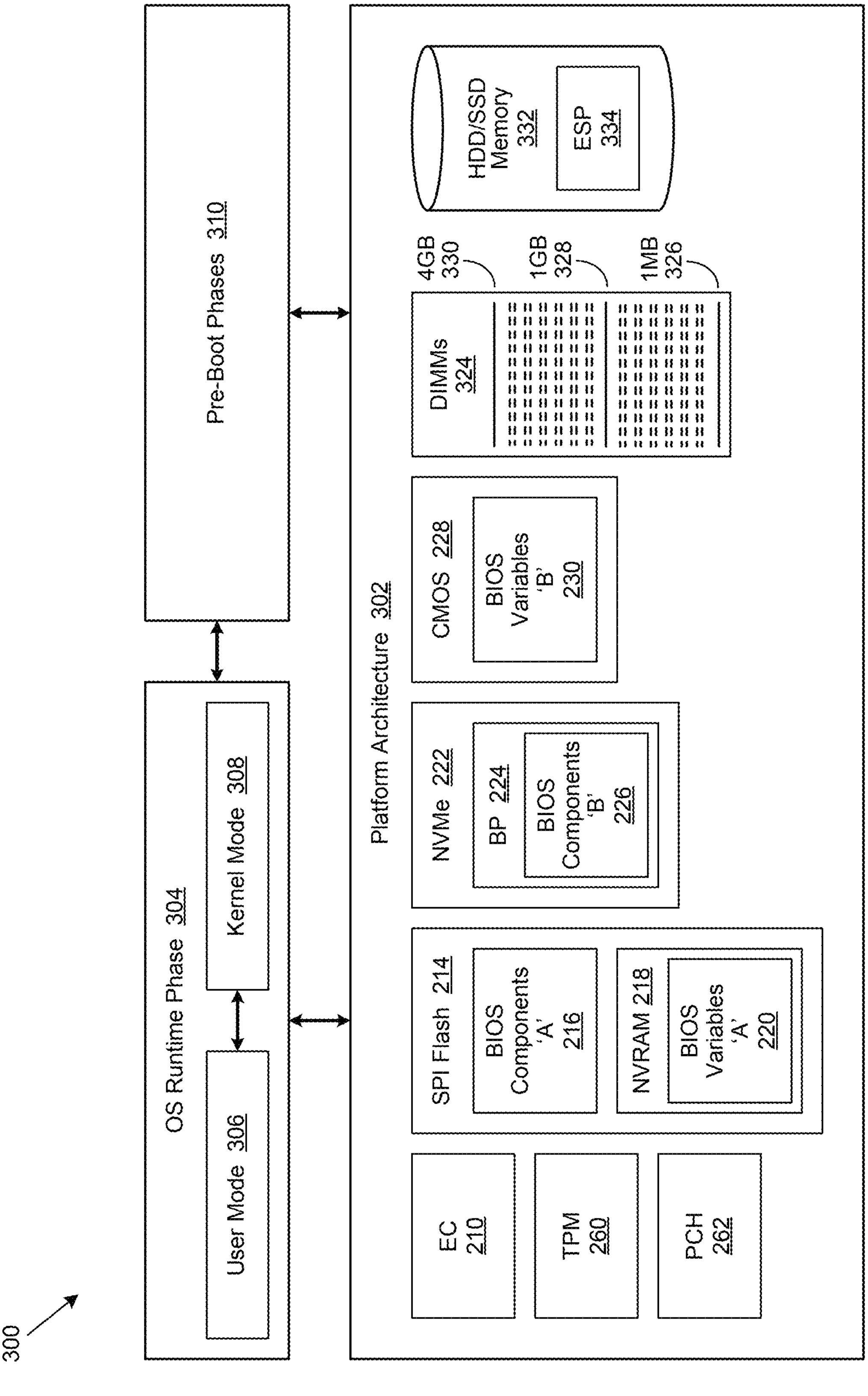
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, a Trusted Platform Module (TPM) 260, a Platform Controller Hub (PCH) 262, Serial Peripheral Interface (SPI) Flash 214 memory, Nonvolatile Memory Express (NVMe) 222 memory, and a complementary metal-oxide-semiconductor (CMOS) 228 chip, or a combination thereof, each of which may be considered a component of an information handling system (IHS), as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the EC 210 may be implemented, directly or indirectly, within the ASDFMP 300 to provide a root of trust function. As used herein, a root of trust broadly refers to a highly reliable component, such as an EC 210, that performs specific, important security functions. In various embodiments, a root of trust component may be implemented as a building block upon which other components of the ASDFMP 300 can derive security functions.

In various embodiments, the EC 210 may be implemented to perform a root of trust operation. As used herein, a root of trust operation broadly refers to a distributed firmware management operation, described in greater detail herein, performed directly, or indirectly, within an ASFDMP 300 to provide a root of trust by leveraging a secure interface to ensure integrity and security of communication between certain components of the ASDFMP 300. In various embodiments, one or more root of trust operations may be performed to enhance the security and trustworthiness of the ASDFMP 300.

Skilled practitioners of the art will be familiar with a TPM 260, which is an international standard for a secure crypto processor, typically implemented as a dedicated microcontroller designed to secure various hardware components of an ASDFMP 300 through the use of integrated cryptographic keys. In various embodiments, a TPM 260 may be implemented to increase the security of an ASDFMP 300 and to protect it against certain firmware attacks. In various embodiments, a TPM 260 may be implemented in combination with an EC 210 to perform a root of trust operation.

Those of skill in the art will likewise be familiar with a PCH 262, which broadly refers to a family of chipsets manufactured by Intel® to control certain data paths and support functions used in conjunction with Intel® processors. However, as used herein, a PCH 262 may broadly refer to one or more processor-agnostic functionalities of an ASDFMP 300 that may be used, directly or indirectly within it, to control various data paths and support functions associated with a particular processor. Examples of such processors include those manufactured by Intel®, AMD®, Qualcomm®, Broadcom® NVidia®, and so forth. Accordingly, various embodiments of the invention reflect an appreciation that provision of such PCH 262 functionalities may require a different implementation for each processor architecture.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
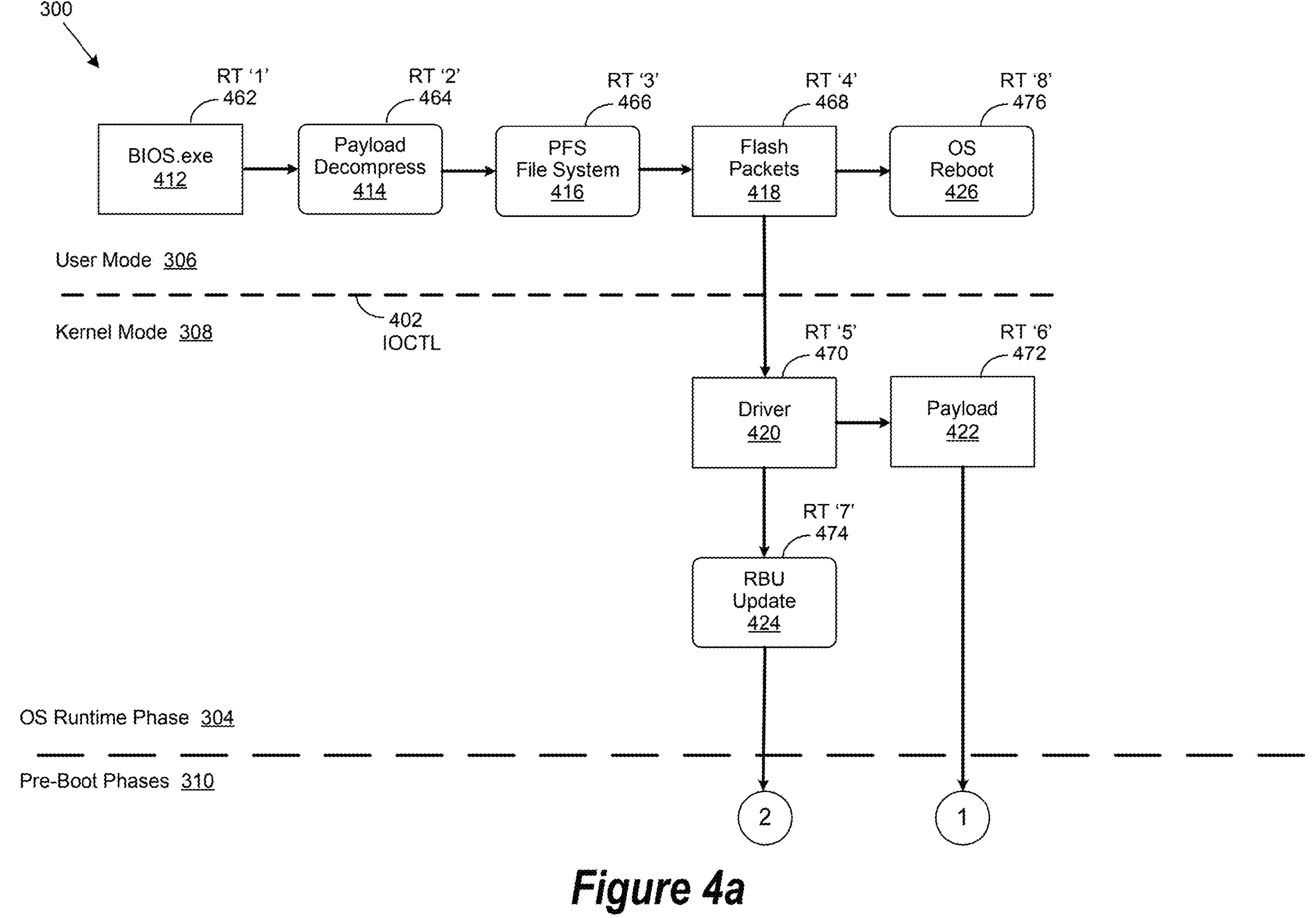
FIGS. 4*a* through 4*c* are a simplified block diagram showing the performance of certain distributed firmware management operations.
Figure 4B:
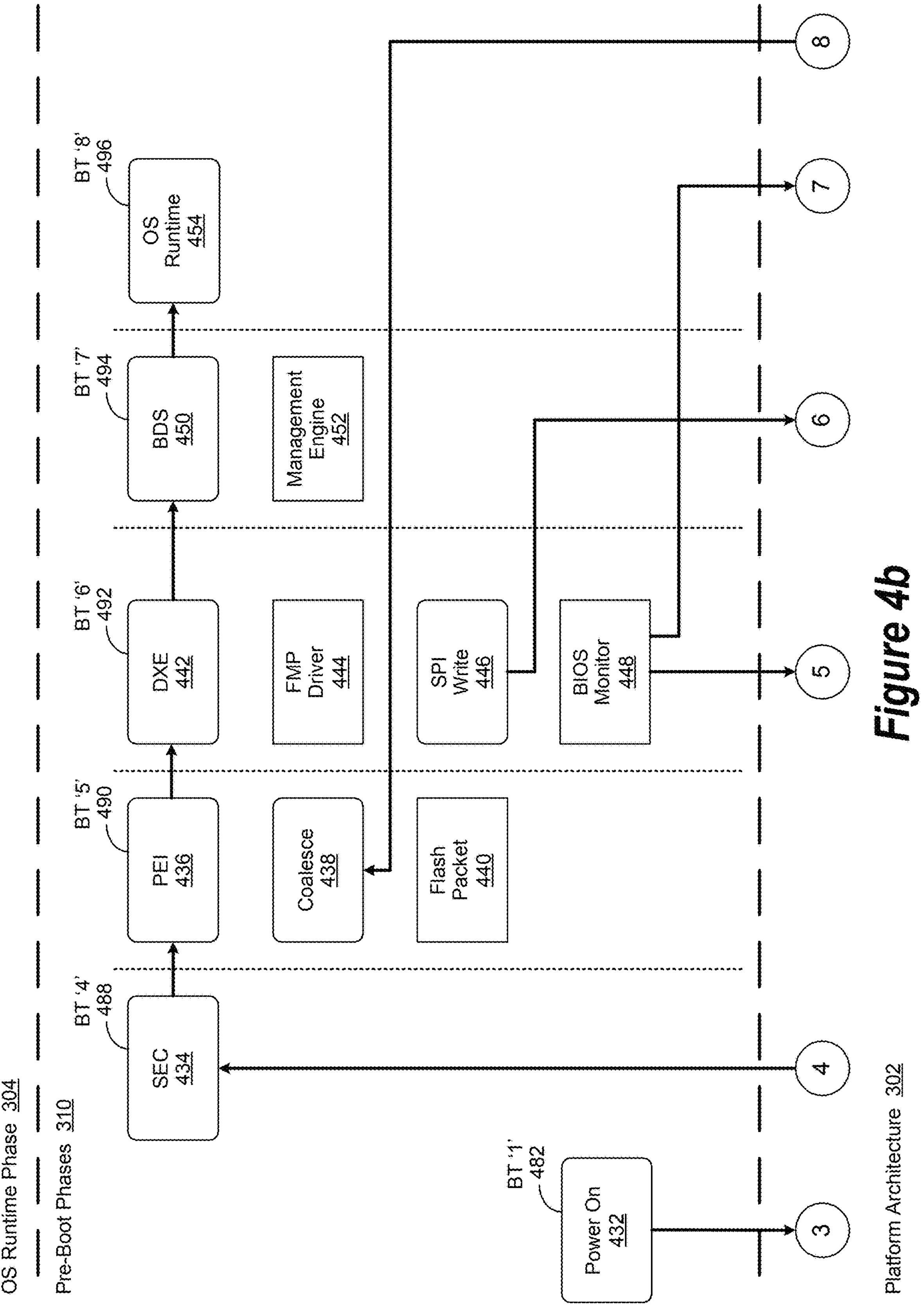
Figure 4C:
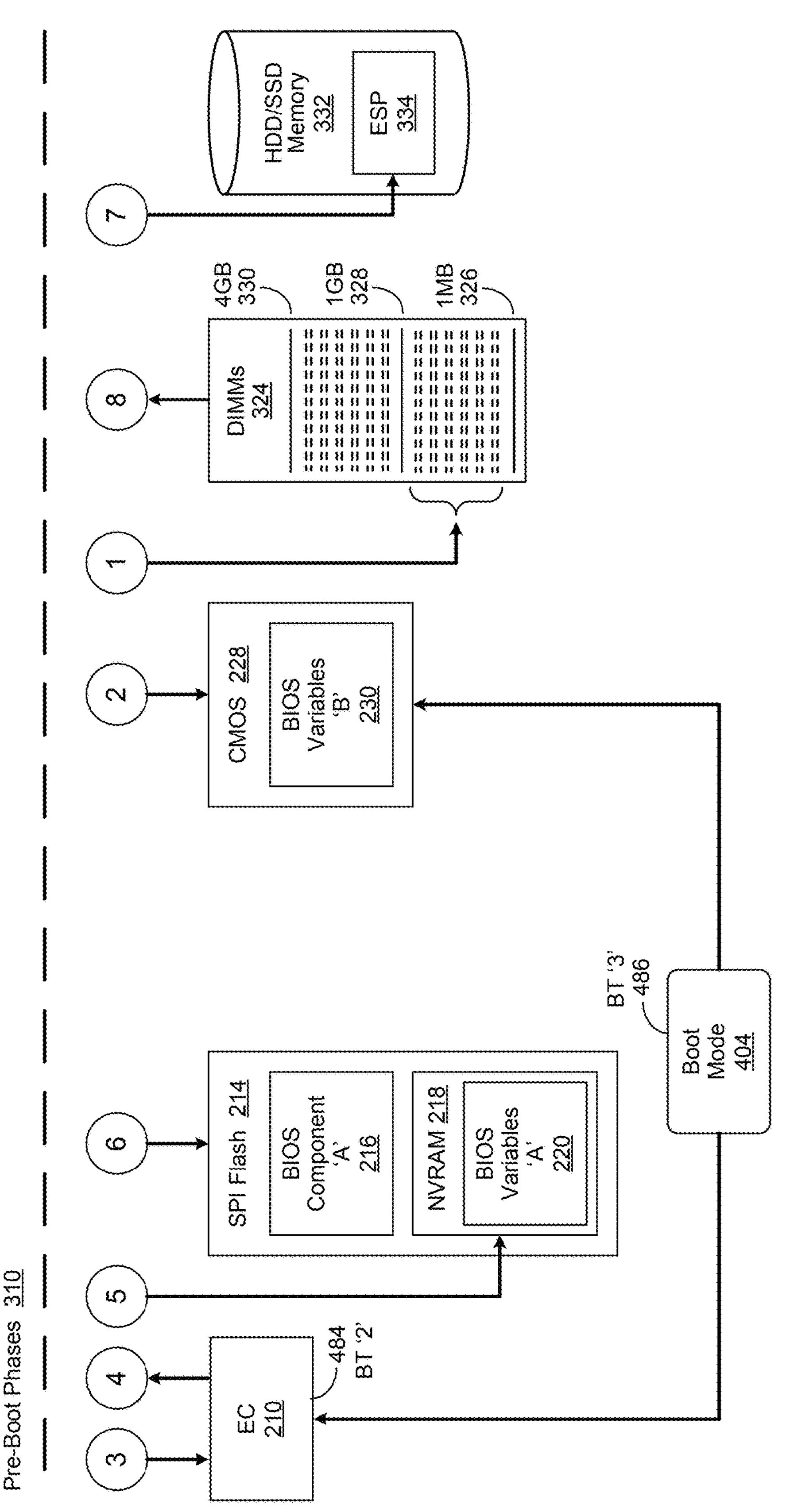

FIGS. 4*a* through 4*c* are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4*a*, a distributed firmware management operation may be initiated by the ASDFMP 300 receiving a BIOS.exe 412 file in runtime (RT) step '1' 462. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328.

Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5:
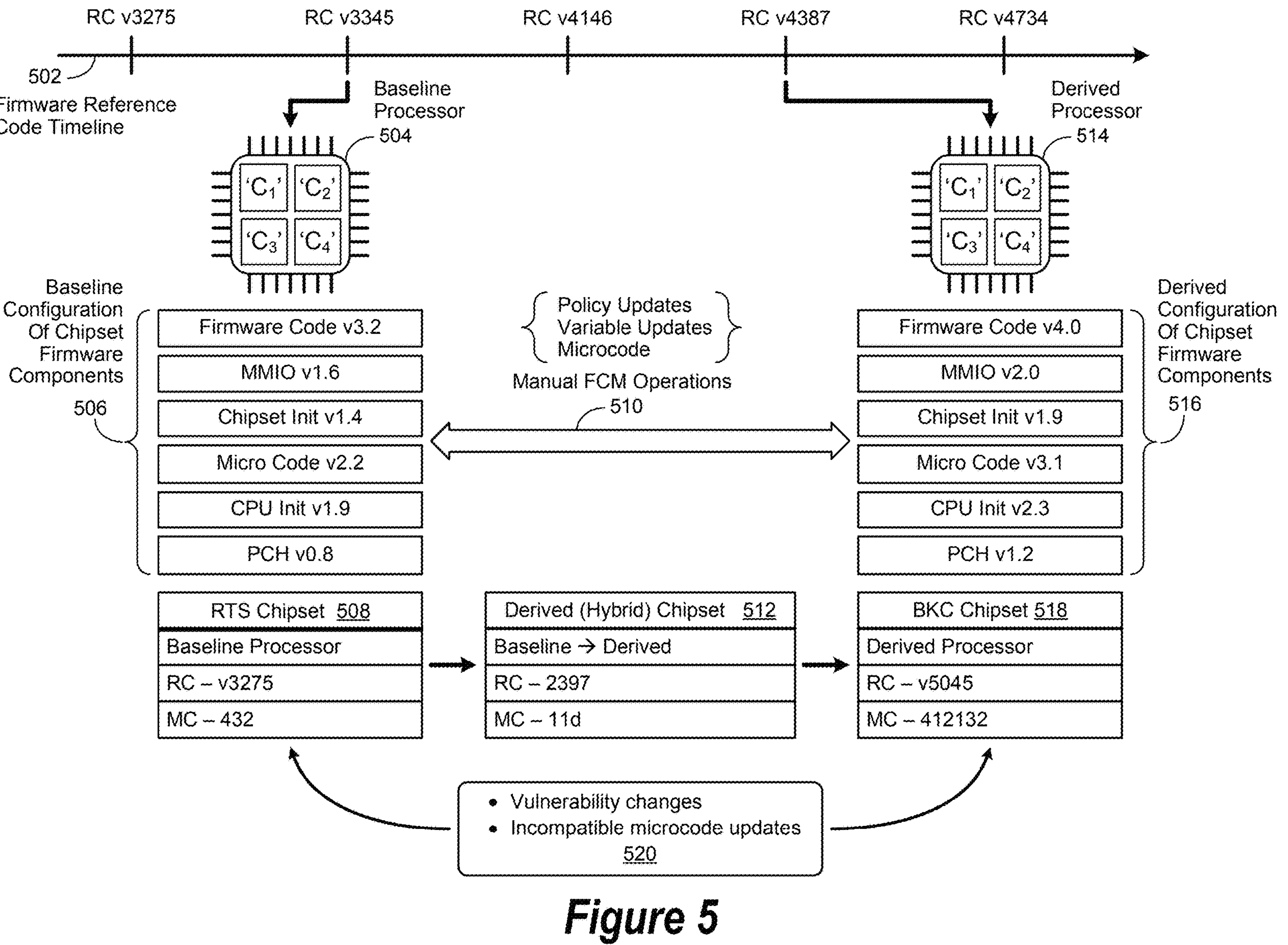
FIG. 5 shows the use of a baseline set of chipset firmware components to manually derive a best known configuration (BKC) of chipset firmware components to support a baseline processor architecture and one or more of its derivative processor architectures.

FIG. 5 shows the use of a baseline set of chipset firmware components to manually derive a best known configuration (BKC) of chipset firmware components implemented in accordance with an embodiment of the invention to support a baseline processor architecture and one or more of its derivative processor architectures. In various embodiments, a reference code (RC) configuration of chipset firmware components, such as "RC v3275" through "RC v4734," each of which is intended to support a baseline processor architecture 504 and one or more of its derivative processor architectures 514, may be released along a firmware RC timeline 502.

In various embodiments, one or more manual firmware compatibility management (FCM) operations 510, described in greater detail herein, may be performed to remap individual components of a baseline configuration of chipset firmware components 506 to individual components of a derived configuration of chipset firmware components 516. In various embodiments, the individual components of the baseline configuration of chipset firmware components 506 may be based upon the version of an associated baseline processor architecture 504. In various embodiments, the individual components of the derived configuration of chipset firmware components 516 may be based upon the version of an associated derived processor architecture 514.

In various embodiments, one or more manual FCM operations 510 may likewise be performed on a Real-Time System (RTS) chipset firmware release 508 corresponding to a baseline processor architecture to generate a derived, or hybrid, chipset firmware release 512, that is a candidate for supporting the baseline processor architecture 504 and one or more of its derivative processor architectures 514. The baseline processor architecture 504 and the derived processor architecture 514 are examples of processor architecture versions. Likewise, one or more manual FCM operations 510 may be performed in various embodiments on the resulting derived, or hybrid, chipset firmware release 512 to generate a chipset BKC firmware release 518. In various embodiments, one or more manual FCM operations 510 may be performed identify, and resolve, certain challenges 520, such as incurred vulnerability resulting from the previously-described remapping of certain chipset firmware components, incompatible microcode updates, and so forth.

Various embodiments of the invention reflect an appreciation that the performance of one or more manual FCM operations 510 to derive a BKC of chipset firmware 518 from an associated RTS chipset firmware 508 may result in an associated system exhibiting unexpected behavior. As an example, the system may exhibit a "Blue Screen Of Death" (BSOD), resulting from a no dump event, a machine check exception, a Windows Hardware Error Architecture (WHEA) uncorrectable error, and so forth. As another example, the system may fail to boot to its operating system (OS) as a result of experiencing an Advanced Configuration and Power Interface (ACPI) Basic Input/Output System (BIOS) error while in a BSOD state. As yet another example, an International Standards Organization (ISO) image file may not be able to be open, or take a long time to open, when the system is in Advanced Host Controller Interface (AHCI) mode.

As yet still another example, booting the system may take a long time when booting from BIOS or Elastic Compute (EC) auto recovery. As another example, the system under test (SUT) may not be able to flash the current Basic Input/Output System (BIOS) firmware when the "Allow BIOS Downgrade" option has been disabled. Yet another example is when the touchpad of a system is inoperable in its Operating System (OS) phase during normal use. Yet still another example is when the system's display controller in Peripheral Component Interface (PCI) output mode changes after an RC BIOS update.

Figure 6A:
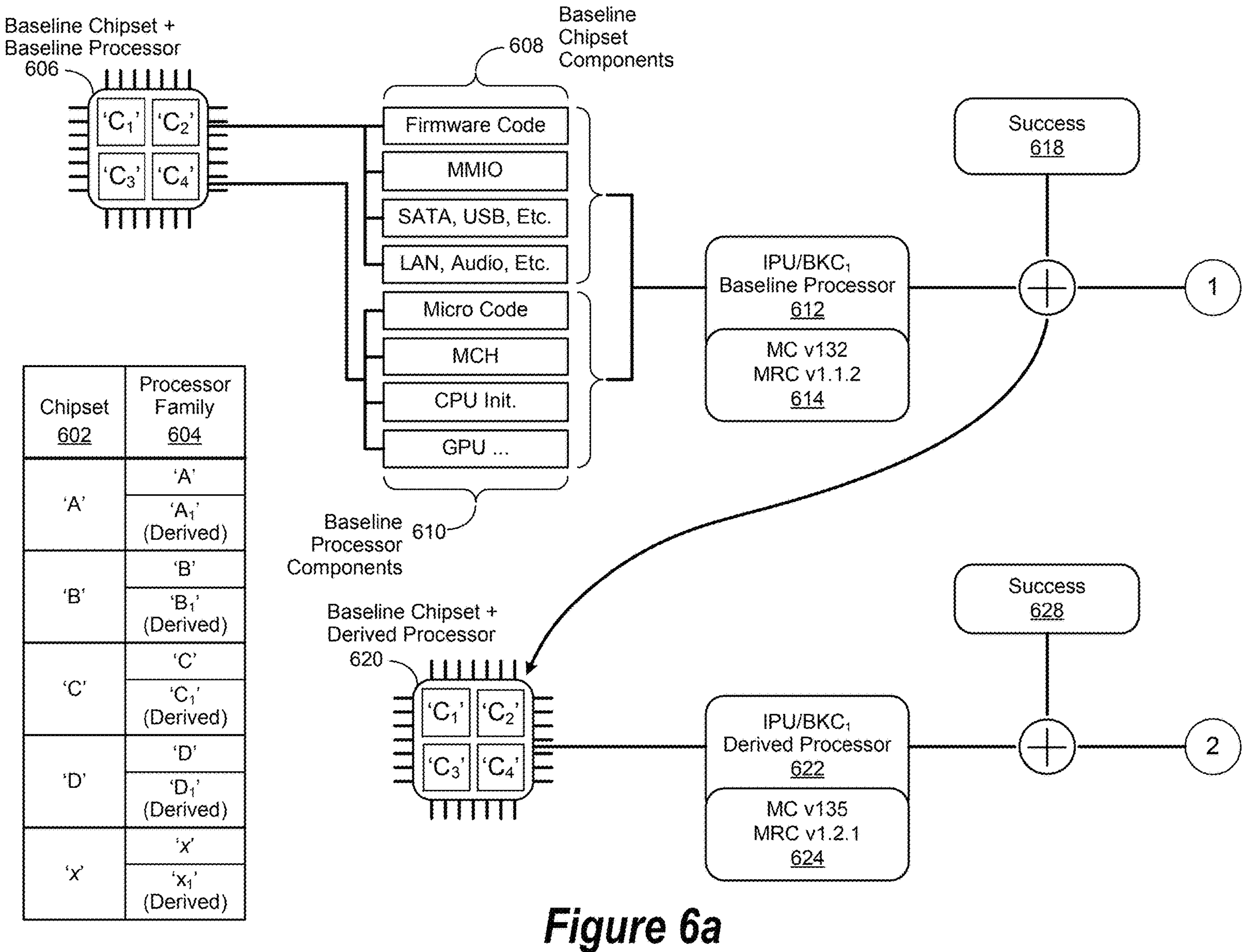
FIGS. 6*a* and 6*b* are a simplified process flow diagram of the performance of certain firmware compatibility management (FCM) operations to automatically generate a BKC of chipset firmware to support a baseline processor architecture and one or more of its derivative processor architectures.
Figure 6B:
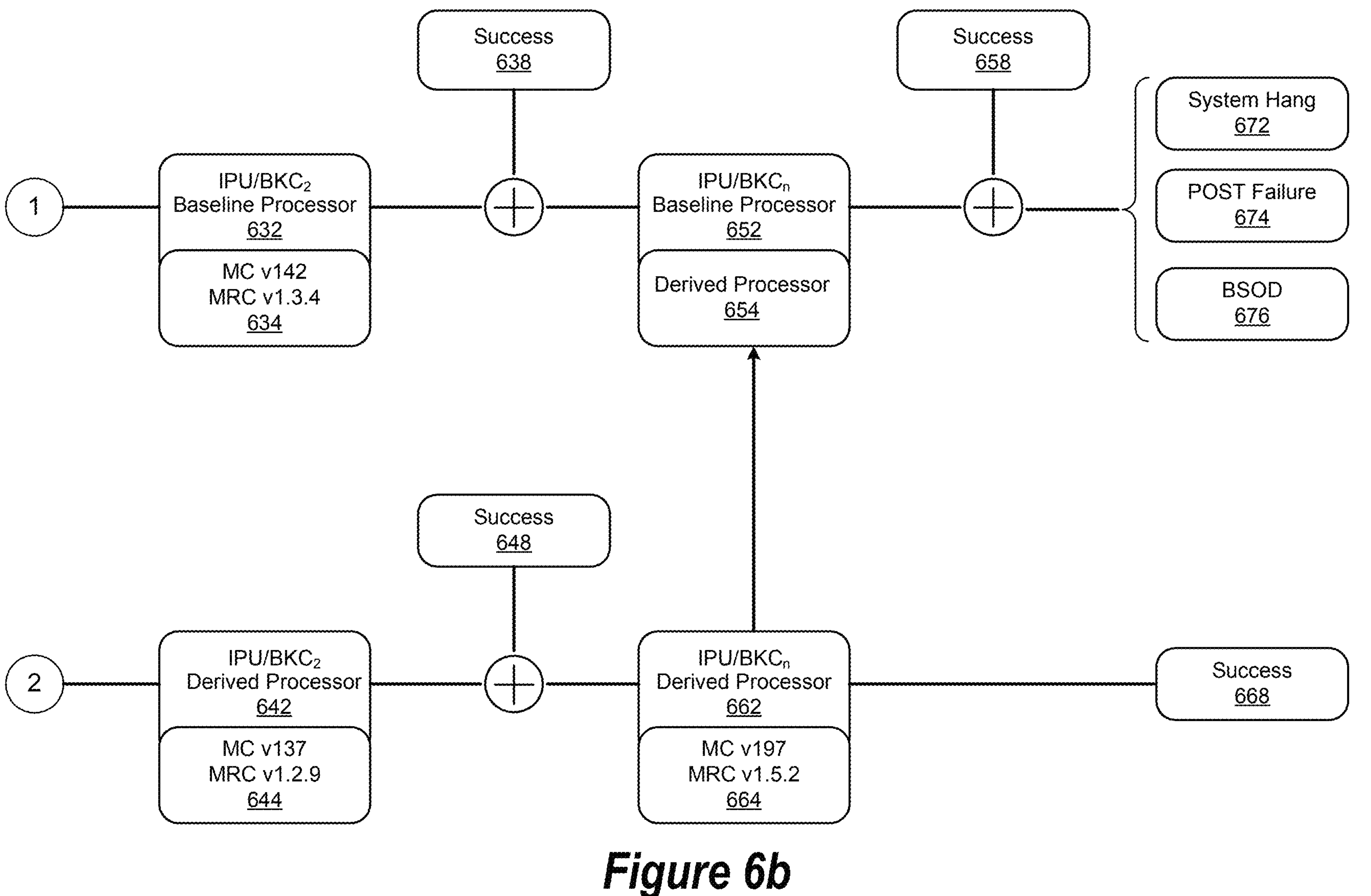

FIGS. 6*a* and 6*b* are a simplified process flow diagram of the performance of certain firmware compatibility management (FCM) operations implemented in accordance with an embodiment of the invention to automatically generate a best known configuration (BKC) of chipset firmware to support a baseline processor architecture and one or more of its derivative processor architectures. In various embodiments, a chipset firmware configuration 602 'A', 'B', 'C', 'D', through 'n' may respectively be implemented to support an associated family of processor architectures 604. In various embodiments, each family of processor architectures 604 may respectively include a baseline processor architecture 'A', 'B', 'C', 'D', through 'x', described in greater detail herein, and one or more respectively associated derived processor architectures '$A_1$', '$B_1$', '$C_1$', '$D_1$', through '$x_1$', likewise described in greater detail herein. In various embodiments, as described in greater detail herein, a baseline configuration of chipset firmware may be implemented to support an associated baseline processor architecture 606. In certain of these embodiments, each baseline configuration of chipset firmware may be implemented to include one or more baseline chipset firmware components 608 and each baseline processor architecture may be implemented to include one or more baseline processor architecture components 610.

In various embodiments, one or more FCM operations may be performed to process the one or more baseline chipset firmware components 608 and the one or more baseline processor architecture components 610 to generate an interconnect processing unit (IPU) and an associated $BKC_1$ of chipset firmware 612 for the baseline processor architecture 606. In various embodiments, the resulting IPU and associated $BKC_1$ of chipset firmware 612 may be implemented to include a particular version of microcode (MC), or memory reference code (MRC), or both 614. In various embodiments, the resulting IPU and associated $BKC_1$ of chipset firmware 612 may then be tested to see whether they successfully 618 support the associated baseline processor architecture 606.

If so, then the resulting IPU and associated $BKC_1$ of chipset firmware 612 may then be used in certain embodiments to generate an IPU and associated $BKC_2$ of chipset firmware 632. In various embodiments, the resulting IPU and associated $BKC_2$ of chipset firmware 632 may be implemented to include a particular version of MC, or MRC, or both 634. In various embodiments, the resulting IPU and associated $BKC_2$ of chipset firmware 632 may then be tested to see whether they successfully 638 support the associated baseline processor architecture 606.

In various embodiments, the IPU and associated $BKC_1$ of chipset firmware 612 for the baseline processor architecture 606 may be implemented in various embodiments to generate an IPU and associated $BKC_1$ of chipset firmware 622 for a particular derived processor architecture 620. In various embodiments, the resulting IPU and associated $BKC_1$ of chipset firmware 622 may be implemented to include a particular version of MC, or MRC, or both 624. In various embodiments, the resulting IPU and associated $BKC_1$ of chipset firmware 622 may then be tested to see whether they successfully 628 support the associated derived processor architecture 620.

If so, then the resulting IPU and associated $BKC_1$ of chipset firmware 622 may then be used in certain embodiments to generate an IPU and associated $BKC_2$ of chipset firmware 642. In various embodiments, the resulting IPU and associated $BKC_2$ of chipset firmware 642 may be implemented to include a particular version of MC, or MRC, or both 644. In various embodiments, the resulting IPU and associated $BKC_2$ of chipset firmware 642 may then be tested to see whether they successfully 648 support the associated derived processor architecture 620.

If so, then the resulting IPU and associated $BKC_2$ of chipset firmware 622 may then be used in certain embodiments to generate an IPU and associated $BKC_n$ of chipset firmware 662. In various embodiments, the resulting IPU and associated $BKC_n$ of chipset firmware 662 may be implemented to include a particular version of MC, or MRC, or both 664. In various embodiments, the resulting IPU and associated $BKC_n$ of chipset firmware 662 may then be tested to see whether they successfully 668 support the associated derived processor architecture 620.

If so, then one or more FCM operations may be performed in various embodiments to use the IPU and associated $BKC_2$ of chipset firmware 642 and the IPU and associated $BKC_n$ of chipset firmware 662 to generate an IPU and associated $BKC_n$ of chipset firmware 652 to support the baseline processor architecture 606. In various embodiments, the resulting IPU and associated $BKC_n$ of chipset firmware 652 may be implemented to include certain derived processor architecture firmware components 654 to support the derived processor architecture 620. In various embodiments, the resulting IPU and associated $BKC_n$ of chipset firmware 652 may then be tested to see whether they successfully 658 support the associated baseline processor architecture 606 and the derived processor architecture 620. If not, a system hang 672, or a Power On Self Test (POST) failure 674, or a "Blue Screen Of Death" (BSOD), and so forth, may be experienced.

Various embodiments of the invention reflect an appreciation that processor manufacturers such as Intel®, AMD®, and Qualcomm® typically pair chipsets with processors from the same family, ensuring compatibility and consistent performance. However, various embodiments of the invention likewise reflect an appreciation that such manufacturers may occasionally make adaptations to existing processor designs, or evolve current designs, to accommodate complex requirements, or add new functionalities, or both, which enable new processors to be seamlessly integrated with existing chipsets. Likewise, various embodiments of the invention reflect an appreciation that processor manufacturers periodically release reference code (RC) firmware updates for both baseline and derived processors supported by the same chipset, which typically comprise microcode (MC), Memory Reference Code (MRC), and other dependent device-specific updates.

Various embodiments of the invention reflect an appreciation that when a processor undergoes an update with its corresponding RC firmware release, its associated system generally boots successfully without issues. However, updating a baseline processor architecture after Remote Terminal Service (RTS) with RC firmware meant for a derived processor architecture may lead to system boot failure. For example, such a failure may occur because the update may introduce changes that affect third-party devices such as Peripheral Component Interconnect (PCI) Direct Memory Access (DMA) controllers or Digital Signal Processor (DSP) controllers. These devices may rely on attributes from the processor architecture that are no longer present due to the update to the latest RC or BKC firmware configuration.

In various embodiments, one or more FCM operations may be automatically performed to facilitate a smooth system boot. In various embodiments, the one or more automated FCM operations may be implemented to map certain components of a baseline chipset firmware configuration to a derived chipset firmware configuration, as described in greater detail herein. In various embodiments, the resulting derived chipset firmware configuration may be implemented to support an associated baseline processor architecture and one or more of its derivative processor architectures, as likewise described in greater detail herein.

In various embodiments, one or more FCM operations may be performed to automatically analyze and adjust the derived chipset firmware RC to align with the requirements of a common system reference code. In various embodiments, one or more FCM operations may be performed to automatically accommodate certain factors such as the existing Real-Time System (RTS) RC, the timing of processor derivation by the processor manufacturer, and the latest stable BKC firmware configuration. In various embodiments, one or more FCM operations may be performed to automatically implement vulnerability solutions from the RC chipset firmware update across both baseline and derived processor architectures to facilitate a smooth boot experience without compatibility concerns.

FIGS. 7*a* and 7*b* are a simplified process flow diagram showing the performance of certain firmware compatibility management (FCM) operations implemented in accordance with an embodiment of the invention to map individual components of a best known configuration (BKC) of chipset firmware to a particular derivative processor architecture. In various embodiments, a chipset firmware configuration 602 'A', 'B', 'C', 'D', through 'n' may respectively be implemented to support an associated family of processor architectures 604. In various embodiments, each family of processor architectures 604 may respectively include a baseline processor architecture 'A', 'B', 'C', 'D', through 'x', described in greater detail herein, and one or more respectively associated derived processor architectures '$A_1$', '$B_1$', '$C_1$', '$D_1$', through '$x_1$', likewise described in greater detail herein.

In various embodiments, updates to a particular chipset firmware configuration 602 'A', 'B', 'C', 'D', through 'n' may not present a challenge 702 to the operation of a corresponding baseline processor architecture 'A', 'B', 'C', 'D', through 'x' of an associated processor family 604. However, updates to a particular chipset firmware configuration 602 'A', 'B', 'C', 'D', through 'n' may present one or more challenges 702 in various embodiments to the operation of a corresponding derived processor architecture '$A_1$', '$B_1$', '$C_1$', '$D_1$', through '$x_1$'. Examples of such challenges 702 may include firmware code incompatibilities, memory-mapped input/output configuration incompatibilities, microcode incompatibilities, platform controller hub (PCH) configuration incompatibilities, and so forth.

In various embodiments, a particular baseline processor architecture 'A', 'B', 'C', 'D', through 'x' of an associated processor family 704 may receive one or more chipset firmware 706 updates, or one or more processor architecture 708 updates, or a combination thereof. In various embodiments, one or more chipset firmware 706 and processor architecture 708 updates may result in a new version of a baseline chipset firmware and associated baseline processor architecture 606, described in greater detail herein. In various embodiments, one or more updates to chipset firmware 706 and processor architecture 708 may result in a new version of a baseline chipset firmware and associated derived processor architecture 620, likewise described in greater detail herein.

In various embodiments, one or more firmware compatibility management (FCM) operations, described in greater detail herein, may be performed to map 710 certain chipset firmware components to an associated derived processor architecture during the Pre Extensible Firmware Interface (PEI) 436 boot phase of an associated information handling system (IHS). In various embodiments, certain processor architecture history 712 information may be used in the performance of one or more FCM operations to map 710 one or more chipset firmware components to an associated derived processor architecture. In various embodiments, one or more FCM operations may be performed to initialize 714 certain chipset firmware components during the PEI boot phase.

In various embodiments, one or more FCM operations may be performed to map 720 certain chipset firmware components to an associated derived processor architecture during the Driver execution Environment (DXE) 442 boot phase of an associated IHS. In certain of these embodiments, one or more FCM operations may be performed to update 722 the Basic Input/Output System (BIOS) of the associated IHS with the mapping 720 of the chipset firmware components to its associated derived processor architecture. In various embodiments, one or more FCM operations may be performed to update 724 the Advanced Configuration and Power Interface (ACPI) 728, the Operating System (OS) policies 730, and the Serial Peripheral Interface (SPI) 732 memory of an associated IHS during its boot device selection (BDS) 450 boot phase such that they may be utilized at OS runtime 454. In various embodiments, one or more FCM operations may be performed to update 726 the ACPI 728, the OS policies 730, and the SPI memory 732 of an associated IHS with certain chipset firmware 706 and processor architecture 708 updates to a particular baseline chipset firmware and its associated baseline processor architecture 606 such that they may be utilized at OS runtime 454.

In various embodiments, one or more FCM operations may be performed to analyze existing chipset firmware components and determine configuration settings for recoveries and updates on an associated IHS. In various embodiments, one or more FCM operations may be performed across certain chipset firmware reference code (RC) versions to identify a best known configuration (BKC) of chipset firmware for a particular processor architecture. In various embodiments, one of more FCM operations may be performed to evaluate chipset firmware and processor initialization code, memory initialization code, peripheral driver dependencies on certain processor architectures, creation of a hand-off block (HOB), and publish the changes in behavior of an associated processor at OS runtime 454, such that all services can then refer to the latest stable RC versions of chipset firmware.

In various embodiments, one or more FCM operations may be performed such that a corresponding driver in the DXE 442 boot phase may identify recovery or update scenarios to update an associated IHS's SPI 732 memory, its Non-Volatile Random Access Memory (NVRAM), its ACPI 728, and OS policies 730. In various embodiments, one or more FCM operation may be performed to enable seamless and uninterrupted chipset firmware update across heterogenous processor architectures supported by the same chipset. In various embodiments, one or more FCM operation may be performed to generate a memory map between chipset firmware components and an associated processor architecture to dynamically resolve certain update time dependencies commonly associated with firmware updates.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

identifying a processor environment installed on an information handling system from a plurality of processor environments, the processor environment comprising a processor architecture, the processor architecture comprising at least one of a baseline processor architecture and a derived processor architecture;

performing a firmware compatibility management operation, the firmware compatibility management operation managing compatibility of a distributed BIOS to support a baseline processor architecture version of the distributed BIOS and a derived processor architecture version of the distributed BIOS, the baseline processor architecture version of the distributed BIOS including a baseline processor architecture firmware component, the derived processor architecture version including an associated best known configuration of a derived firmware component;

providing the information handling system with the distributed BIOS, the distributed BIOS comprising a particular firmware configuration, the particular firmware configuration comprising a particular set of firmware components, the particular set of firmware components being based upon at least one of the processor architecture version and the derived processor architecture version; and, booting the information handling system using the particular firmware configuration based upon at least one of the baseline processor architecture and the derived processor architecture version.

2. The method of claim 1, wherein:

the baseline processor architecture version comprises comprising a referential starting point for creating a derivative thereof; and, the information handling system comprises a baseline processor architecture processor chipset.

3. The method of claim 2, wherein:

the particular set of firmware components comprises a baseline configuration of chipset firmware components.

4. The method of claim 3, wherein:

the derived processor architecture is based upon the baseline processor architecture;

and, the information handling system comprises a derived processor architecture processor chipset.

5. The method of claim 4, wherein:

the particular set of firmware components comprises a derived configuration of chipset firmware components.

6. The method of claim 5, wherein:

the derived configuration of chipset firmware components are generated via the firmware compatibility management operation.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying a processor environment installed on an information handling system from a plurality of processor environments, the processor environment comprising a processor architecture, the processor architecture comprising at least one of a baseline processor architecture and a derived processor architecture;

performing a firmware compatibility management operation, the firmware compatibility management operation managing compatibility of a distributed BIOS to support a baseline processor architecture version of the distributed BIOS and a derived processor architecture version of the distributed BIOS, the baseline processor architecture version of the distributed BIOS including a baseline processor architecture firmware component, the derived processor architecture version including an associated best known configuration of a derived firmware component;

providing the information handling system with the distributed BIOS, the distributed BIOS comprising a particular firmware configuration, the particular firmware configuration comprising a particular set of firmware components, the particular set of firmware components being based upon at least one of the processor architecture version and the derived processor architecture version; and, booting the information handling system using the particular firmware configuration based upon at least one of the baseline processor architecture and the derived processor architecture version.

8. The system of claim 7, wherein:

the baseline processor architecture version comprises comprising a referential starting point for creating a derivative thereof; and, the information handling system comprises a baseline processor architecture processor chipset.

9. The system of claim 8, wherein:

the particular set of firmware components comprises a baseline configuration of chipset firmware components.

10. The system of claim 9, wherein:

the derived processor architecture is based upon the baseline processor architecture; and, the information handling system comprises a derived processor architecture processor chipset.

11. The system of claim 10, wherein:

the particular set of firmware components comprises a derived configuration of chipset firmware components.

12. The system of claim 11, wherein:

the derived configuration of chipset firmware components are generated via the firmware compatibility management operation.

13. A non-transitory, computer-readable storage medium embodying computer program code, the computer program code comprising computer executable instructions configured for:

identifying a processor environment installed on an information handling system from a plurality of processor environments, the processor environment comprising a processor architecture, the processor architecture comprising at least one of a baseline processor architecture and a derived processor architecture;

performing a firmware compatibility management operation, the firmware compatibility management operation managing compatibility of a distributed BIOS to support a baseline processor architecture version of the distributed BIOS and a derived processor architecture version of the distributed BIOS, the baseline processor architecture version of the distributed BIOS including a baseline processor architecture firmware component, the derived processor architecture version including an associated best known configuration of a derived firmware component;

providing the information handling system with the distributed BIOS, the distributed BIOS comprising a particular firmware configuration, the particular firmware configuration comprising a particular set of firmware components, the particular set of firmware components being based upon at least one of the processor architecture version and the derived processor architecture version; and, booting the information handling system using the particular firmware configuration based upon at least one of the baseline processor architecture and the derived processor architecture version.

14. The non-transitory, computer-readable storage medium of claim 13, wherein:

the baseline processor architecture version comprises comprising a referential starting point for creating a derivative thereof; and, the information handling system comprises a baseline processor architecture processor chipset.

15. The non-transitory, computer-readable storage medium of claim 14, wherein:

the particular set of firmware components comprises a baseline configuration of chipset firmware components.

16. The non-transitory, computer-readable storage medium of claim 15, wherein:

the derived processor architecture is being based upon the baseline processor architecture; and, the information handling system comprises a derived processor architecture processor chipset.

17. The non-transitory, computer-readable storage medium of claim 16, wherein:

the particular set of firmware components comprises a derived configuration of chipset firmware components.

18. The non-transitory, computer-readable storage medium of claim 17, wherein:

the derived configuration of chipset firmware components are generated via firmware compatibility management operation.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *